United States Patent
Tarkiainen et al.

(10) Patent No.: US 6,956,352 B2
(45) Date of Patent: Oct. 18, 2005

(54) VECTOR CONTROL OF AN INDUCTION MOTOR

(75) Inventors: Antti Tarkiainen, Lappeenranta (FI); Riku Pöllänen, Lappeenranta (FI)

(73) Assignee: ABB OY, Helsinki (FI)

( * ) Notice: Subject to any disclaimer, the term of this patent is extended or adjusted under 35 U.S.C. 154(b) by 150 days.

(21) Appl. No.: 10/471,862

(22) PCT Filed: Mar. 18, 2002

(86) PCT No.: PCT/FI02/00221
§ 371 (c)(1),
(2), (4) Date: Sep. 15, 2003

(87) PCT Pub. No.: WO02/075915
PCT Pub. Date: Sep. 26, 2002

(65) Prior Publication Data
US 2004/0080968 A1 Apr. 29, 2004

(30) Foreign Application Priority Data
Mar. 19, 2001 (FI) .......................... 2001-0557

(51) Int. Cl.$^7$ ................................ H02P 5/34
(52) U.S. Cl. ................ 318/800; 318/805; 318/811
(58) Field of Search .............. 318/800, 802, 318/805, 808, 811, 815

(56) References Cited

U.S. PATENT DOCUMENTS

| | | | | |
|---|---|---|---|---|
| 3,989,991 A | * | 11/1976 | Brennen et al. | ............ 318/805 |
| 4,451,771 A | * | 5/1984 | Nagase et al. | ............ 318/800 |
| 4,459,534 A | * | 7/1984 | Nagase et al. | ............ 318/808 |
| 4,503,376 A | * | 3/1985 | Okuyama | .................... 318/802 |
| 4,680,526 A | | 7/1987 | Okuyama et al. | ........... 318/802 |
| 4,767,976 A | * | 8/1988 | Mutoh et al. | ................ 318/808 |
| 4,780,658 A | * | 10/1988 | Koyama | .................... 318/808 |
| 5,475,293 A | * | 12/1995 | Sakai et al. | .................. 318/802 |
| 5,629,597 A | | 5/1997 | Imanaka | ..................... 318/805 |

FOREIGN PATENT DOCUMENTS

| | | |
|---|---|---|
| EP | 0 555 557 A1 | 8/1993 |
| EP | 0 645 879 A1 | 3/1995 |
| WO | 97/30510 | 8/1997 |

* cited by examiner

*Primary Examiner*—Bao Q. Vu
(74) *Attorney, Agent, or Firm*—Dykema Gossett PLLC

(57) ABSTRACT

The invention relates to a method in connection with an inverter, the inverter comprising a direct voltage intermediate circuit, an optimum switching table and output power switches. The method comprises steps where phase currents ($i_A$, $i_C$) of the inverter are converted to a synchronous dq coordinate system in order to achieve vector components ($i_d$, $i_q$), the synchronous current vector components ($i_d$, $i_q$) are low pass filtered in order to achieve current vector components ($i_{d,lpf}$, $i_{q,lpf}$), a current reference ($i_{q,ref}$) is generated in the direction of the q axis, a current reference ($i_{d,ref}$) is generated, a torque reference ($t_{e,ref}$) is generated, an absolute value reference ($|\psi|_{ref}$) of a flux linkage is generated from the currents and switching commands are formed on the basis of the torque reference ($t_{e,ref}$) and the flux reference ($|\psi|_{ref}$) using the optimum switching table (5).

11 Claims, 2 Drawing Sheets

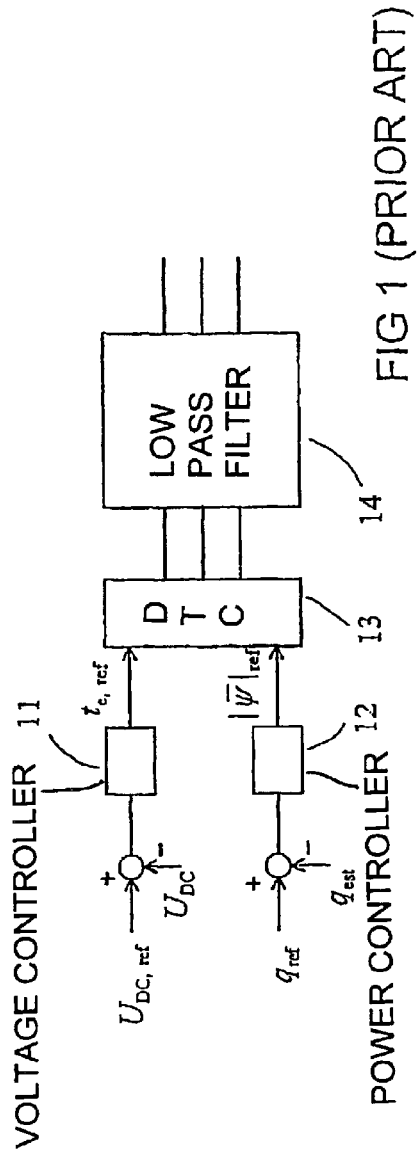
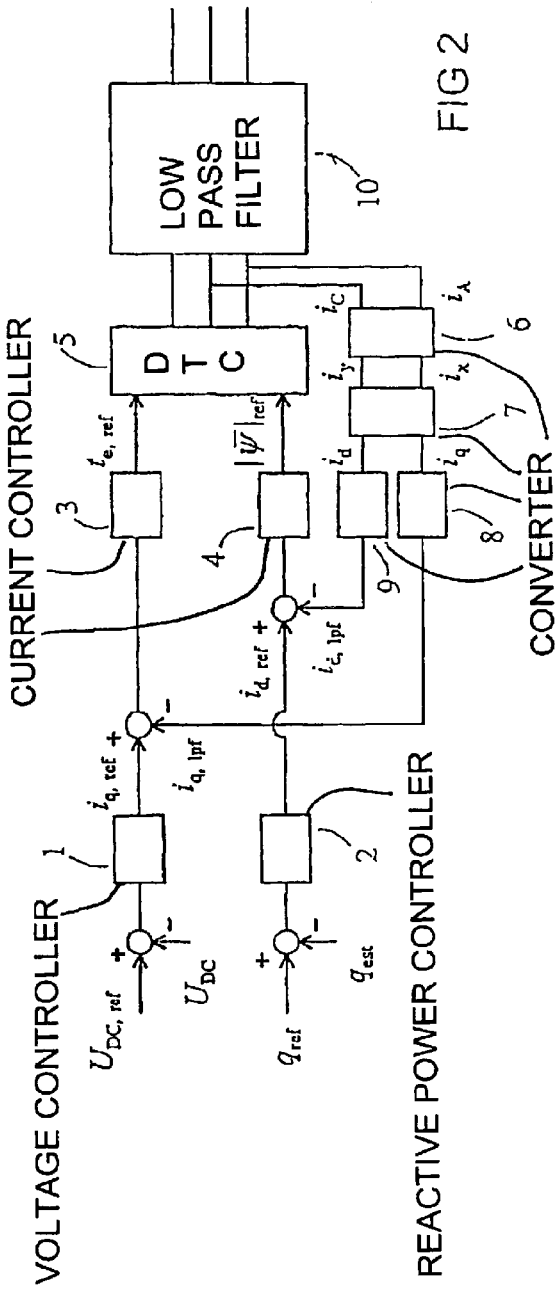

VECTOR CONTROL OF AN INDUCTION MOTOR

BACKGROUND OF THE INVENTION

The invention relates to a method in connection with an inverter, the inverter comprising a direct voltage intermediate circuit, an optimum switching table and output power switches.

A frequency converter is a device that is typically used for motor control. A frequency converter typically consists of two converters, between which there is a direct voltage or direct current intermediate circuit. The converters of a frequency converter can be implemented in such a way that they are capable of functioning only as rectifiers, or in such a way that they can function, if required, as both rectifiers and inverters. An example of rectifiers is a diode bridge, and an example of a converter applicable to both rectification and inversion is a converter bridge implemented by means of transistors. An inverter is typically used to control the power transferred from the intermediate circuit of a frequency converter to a motor. By means of an inverter, motor control can be implemented reliably in such a way that the motor implements for example the desired speed or torque command accurately. An inverter can also be used for controlling the power flow from the electrical power network to the intermediate circuit of the frequency converter. An inverter used for this purpose is usually called a network inverter. A network inverter allows efficient control of the active and reactive powers transferred between the electrical power network and the frequency converter.

A network inverter is used for replacing a diode bridge rectifier of a frequency converter, particularly in such objects of use where it is desirable to invert the braking energy of a motor back to the electrical power network. The curve form of the supply current of the network inverter can be made very sinusoidal, owing to which it is well applicable to objects where the lowering of the electricity quality caused by the frequency converter must be reduced.

Present high-rate power semiconductor components and signal processors makes it possible to implement the control of an inverter dynamically with a high rate by using solutions based on direct torque control (DTC). A known network inverter based on DTC control is shown in the block diagram of FIG. 1. In the solution of FIG. 1, the switching commands of a semiconductor power switch bridge is formed in accordance with the DTC principle on the basis of the absolute value of the flux linkage vector and of the torque by using a DTC block 13. The computational flux linkage vector of the network inverter is calculated with a voltage integral $$\overline{\psi} = \int \overline{u} \, dt, \quad (1)$$

and the torque proportional to the power is calculated by the cross product of the power vector and the flux linkage vector $$t_e = |\overline{\psi} \times \overline{i}|. \quad (2)$$

An intermediate circuit voltage controller 11 generates the torque reference $t_{e,ref}$ on the basis of the difference between the measured intermediate circuit voltage and intermediate circuit voltage reference. The absolute value reference $|\overline{\psi}|_{ref}$ of the flux linkage is generated by means of a reactive power controller 12 by comparing the estimated reactive power $q_{est}$ and reactive power reference $q_{ref}$. In connection with network inverters, a low pass filter 14 is typically used between the inverter and the network. When the filter type is an L filter, the reactive power is estimated with the equation $$q_{est} = (\overline{\psi}_v \cdot \overline{i}) \omega, \quad (3)$$

where $\omega$ is the electric angular frequency corresponding to the direct wave of the network, and $\overline{\psi}_v$ is the flux linkage vector of the network. The flux linkage vector of the network is estimated with the equation $$\overline{\psi}_v = \overline{\psi} - L \, \overline{i}, \quad (4)$$

where L is the inductance of the network filter.

Conventionally, the object of application of power vector control methods has been control of electric motor use provided with separate PWM modulators. The principle of power vector control of electric motor use provided with a PWM modulator is shown in FIG. 3. Power controllers 31, 32 generate a voltage vector reference, the intention being to implement the reference by means of a PMW modulator 33 controlling power switches 34. The solution is disclosed for instance in the publication Harnefors, L., 'On Analysis, Control and Estimation of Variable-speed drives', Doctoral dissertation, Part I, page 44, Royal Institute of Technology, Stockholm, Sweden, 1997.

A direct DTC control method of a network inverter similar to that in FIG. 1 does not actively control the currents of the converter. As a result, the currents of the converter may be non-sinusoidal and contain significantly lower harmonic components, such as $5^{th}$ or $7^{th}$ harmonic. The harmonic current components supplied by the converter are particularly intensified if, instead of an L filter, the network filter is an LCL filter.

BRIEF DESCRIPTION OF THE INVENTION

An object of the invention is to provide a method by means of which the above-mentioned disadvantages are avoided and to enable control to a network inverter more accurately than before by using the same measurements as previously. The object is achieved with a method according to the invention, characterized by the method comprising the steps of defining a synchronous rectangular dq coordinate system;

measuring the phase currents of the inverter outputs;

converting the phase currents of the inverter to a synchronous dq coordinate system in order to achieve synchronous rectangular current vector components;

low-pass-filtering the synchronous current vector components in order to achieve low-pass-filtered current vector components;

generating a current reference in the direction of the q axis of the dq coordinate system;

generating a current reference in the direction of the d axis of the dq coordinate system;

generating a torque reference by comparing the current reference in the direction q with a low-pass-filtered current vector component in the direction q;

generating an absolute value reference of the flux linkage by comparing the current reference in the direction d with a low-pass-filtered current vector component in the direction d; and forming switching commands of the power switches on the basis of the torque reference and the flux reference by using an optimum switching table.

The method according to the invention is based on the idea that the output current of the network inverter is controlled actively, as a result of which the control method according to the invention provides a network current that is significantly more sinusoidal than before. In the method according to the invention, the current controllers generate an absolute value reference of the flux linkage and a torque instead of a voltage vector reference. Separate voltage vectors are further selected on the basis of said reference variables with a DTC algorithm by using an optimum switching table.

The control method according to the invention uses no additional measurements, nor does it set any special requirements compared with the direct DTC control method. Deviating from conventional current vector control methods using a separate PWM modulator, the method according to the invention uses a DTC algorithm in the selection of the voltage vector.

BRIEF DESCRIPTION OF THE FIGURES

The invention will now be described in more detail by way of preferred embodiments, with reference to the attached drawings, of which:

FIG. 1 shows a block diagram of direct DTC control to a network inverter (prior art);

FIG. 2 shows a block diagram implementing a method according to the invention.

DETAILED DESCRIPTION OF THE INVENTION

Figure 3:
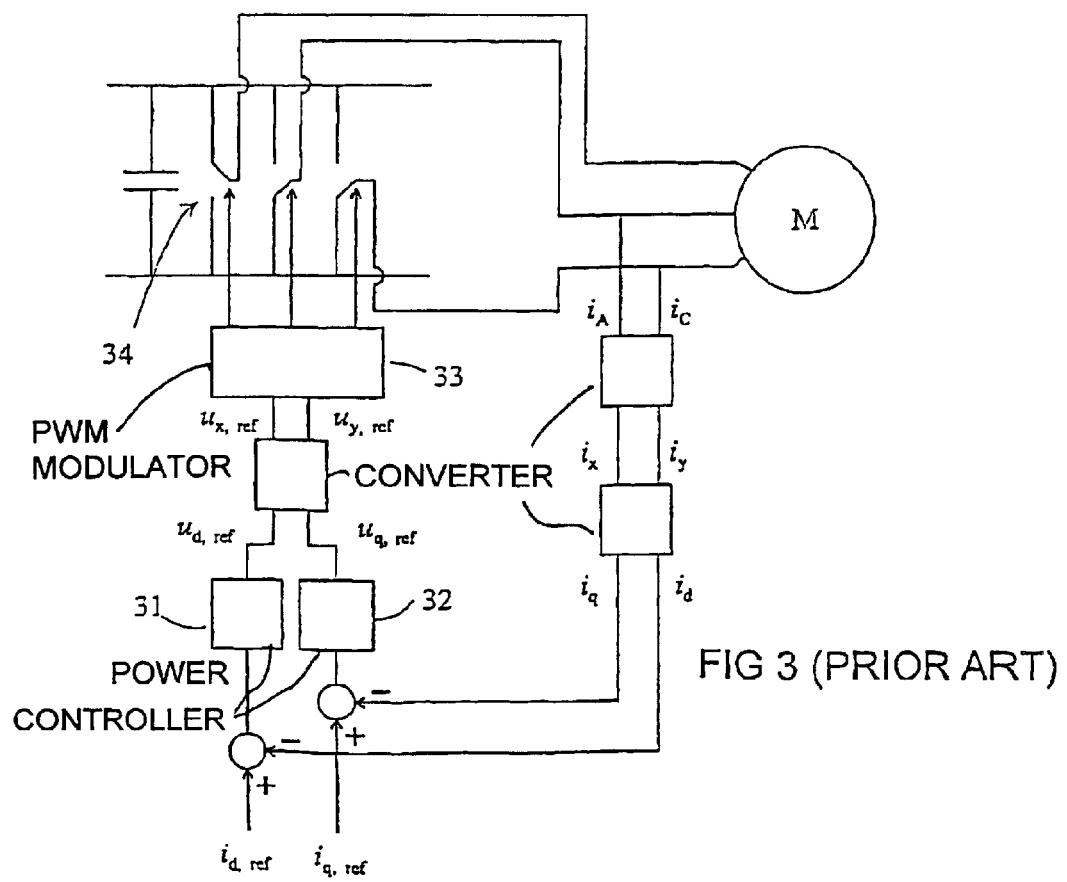
FIG. 3 shows a principled diagram of current vector control of an electric motor controlled by a PWM modulator (prior art).

A block diagram implementing the method according to the invention is shown in FIG. 2. The control structure is of cascade control type, the control consisting of control loops within each other. The outermost controllers are an intermediate voltage controller 1 and a reactive power controller 2. The intermediate voltage controller generates a current reference $i_{q,ref}$ in the direction q, and the reactive power controller 2 generates a current reference $i_{d,ref}$ in the direction d. The inner controllers are current controllers 3 and 4 functioning in a synchronous rectangular dq coordinate system and generating an absolute value reference $|\bar{\psi}|_{ref}$ of the flux linkage and a torque reference $t_{e,ref}$ for the selection algorithm of a DTC voltage vector. The innermost control loop, which is included in the DTC block 5 in FIG. 2, is formed of hysteresis control of the absolute value of the flux linkage and of the torque.

In accordance with the space vector theory, the variables of a three-step system can be indicated by one rotating vector (e.g. vector $\bar{s}$), which can be divided into rectangular components ($S_d$, $S_q$). The above-mentioned synchronus dq coordinate system thus refers to a coordinate system which rotates along with an electronic property and being bound thereto. Typically, a synchronous coordinate system is bound to a rotating flux linkage vector, for example. In such a case, the direction of the d axis of the coordinate system is determined to be the direction of said flux linkage vector, and the direction of the q axis is determined to be 90 degrees from this direction.

In accordance with the method of the invention, a synchronous rectangular dq coordinate system is determined. The synchronous coordinate system is preferably selected in such a way that the d axis of the coordinate system is parallel to the flux linkage vector $\bar{\psi}$ of the network inverter. The direction of the flux linkage vector is determined by using for example a precise model of a motor, which can also be applied in connection with a network inverter without a physical motor. Such a motor model is typically included in the DTC algorithm so that the direction of the flux linkage vector is provided simply by using the model. Another alternative for determining the flux linkage vector is to calculate it by using the voltage integral of model (1). A synchronous coordinate system rotating at the angular speed of the network can be bound to other variables instead of the flux linkage vector of a network inverter, such as to the flux linkage vector of the network or the voltage vector of the network. In such a case, however, additional measurements may have to be used.

In accordance with the method, the phase currents of the outputs of the inverter are measured. Measurement of two phase currents are sufficient to determine the current vector if it is assumed that there is no neutral conductor in the alternate current system. Thus, FIG. 2 showing the method according to the invention only indicates measurement of currents $i_A$ and $i_C$ of phases A and C.

In accordance with the invention, the measured phase currents $i_A$ and $i_C$ are converted to a synchronous dq coordinate system. The coordinate system conversion is preferably performed in such a way that the measured phase variables are converted with a coordinate system conversion member 6 at first to a stationary xy coordinate system, in which the current vector can be denoted by rectangular components $i_x$ and $i_y$. The measured currents $i_x$ and $i_y$ are further converted with a coordinate system conversion member 7 at the angular frequency of the network to a rotating synchronous dq coordinate system. The coordinate system conversion from the xy coordinate system to the dq coordinate system can be performed by means of trigonometric functions $$i_d = i_x \cos\theta + i_y \sin\theta$$
$$i_q = -i_x \sin\theta + i_y \cos\theta, \tag{5}$$

where θ is the angle between the stationary coordinate system and the synchronous coordinate system. In coordinate system changes, the voltage integral, i.e. the flux linkage $\bar{\psi}$, can also be utilized by using for the conversion the formulae $$i_d = \frac{\bar{\psi} \cdot \bar{i}}{|\bar{\psi}|} \tag{6}$$

$$i_q = \frac{\bar{\psi} \times \bar{i}}{|\bar{\psi}|}.$$

where $\bar{i}=i_x+i_y$. In this case, calculating trigonometric functions and finding out the precise angle of the flux linkage of the network inverter are avoided. In the formula (6), the cross product is to be understood as scalar operator $\bar{\psi} \times \bar{i} = \psi_x i_y - \psi_y i_x$, because the direction of the vector generated by the cross product has in this case no meaningful physical interpretation.

Changes in the coordinate system can be made in a plurality of ways, two of which have been shown above in equations (5) and (6). In connection with coordinate system changes, also other signal processing operations, such as low-pass filtering, can be performed.

The torque of the network inverter can be calculated as the cross product of the flux linkage vector and current vector. Indicated in the synchronous coordinate system, the expression of the torque is $$t_e = \bar{\psi} \times \bar{i} = \psi_d i_q - \psi_q i_d. \tag{7}$$

In the dq coordinate system bound to the flux linkage of the network inverter, the flux linkage has naturally no component in the direction of the q axis. Thus, when operating in the dq coordinate system, $\psi_q=0$ and $\psi_d=|\psi|$, whereby the expression of the torque can be indicated as $$t_e=\psi_d i_q=|\overline{\psi}|i_q, \tag{8}$$

so that the torque of the converter can be adjusted with a current in the direction q.

The reactive power of the steady state of the network inverter in the case of an L filter can be calculated with the formula $$q=(\overline{\psi}_v \cdot \overline{i})\omega, \tag{9}$$

where the flux linkage vector is $$\overline{\psi}_v 32 \ \overline{\psi}-L\overline{i}. \tag{10}$$

Positioning the equation (10) in the equation (9) gives $$\begin{aligned} q &= ((\overline{\psi}-L\overline{i})\cdot \overline{i})\omega \\ &= ((\overline{\psi}\cdot \overline{i})-L(\overline{i}\cdot \overline{i}))\omega \\ &= ((\overline{\psi}\cdot \overline{i})-L|\overline{i}|^2)\omega, \end{aligned} \tag{11}$$

which, as shown in the synchronous coordinate system, is $$q=(\psi_d i_d+\psi_q i_q-L|\overline{i}|^2)\omega. \tag{12}$$

When operating in the synchronous coordinate system bound to the flux vector of the network inverter, $\psi_q=0$ and $\psi_d=|\overline{\psi}|$, which gives $$q=(|\psi|i_d-L|\overline{i}|^2)\omega. \tag{13}$$

Since the inductance L of the network filter is usually small, the meaning of the latter term of the equation (13) is small compared with the first term. Thus, the effect of the current in the direction q on the reactive power is small, and the reactive power of the network inverter can be adjusted with a current in the direction d.

In accordance with the invention, a current reference $i_{q,ref}$ in the direction of the q axis and a current reference $i_{d,ref}$ in the direction of the d axis of the dq coordinate system are further generated. The current reference $i_{d,ref}$ in the direction of the d axis is preferably determined by using a reactive power controller 2. The task of the reactive power controller is to generate a reference of a current in the direction d that remains almost constant, with which reference the desired power factor is achieved for the network inverter as described above. There are no significant dynamic performance requirements for the reactive power controller 2. Since the current reference in the direction d that keeps the power factor of the network inverter one is very close to zero, it is possible to leave out the reactive power controller altogether and to use a fixed reference value of the current in the direction d instead, or to calculate a suitable reference value with an open circuit equation.

In accordance with a preferred embodiment of the invention, a current reference $i_{d,ref}$ is generated by comparing the estimated reactive power $q_{est}$ with the reactive power reference $q_{ref}$. The comparison is performed in such a way that an estimated value is subtracted from the reference. The difference variable provided as the result of the subtraction functions as the input of the reactive power controller, and a current reference $i_{d,ref}$ is obtained from the output of the controller.

The intermediate circuit voltage controller 1 generates a reference value $i_{q,ref}$ of the current in the direction q. The intermediate circuit voltage controller 1 is the most important controller of the network inverter, and together with a current controller 3 in the direction q, it determines the performance of the intermediate circuit voltage control. In accordance with a preferred embodiment of the invention, the current reference in the direction of the q axis is generated by using a direct voltage control value $U_{dc,ref}$ of the intermediate circuit and the determined voltage $U_{dc}$ of the intermediate circuit of the inverter. The current reference itself is generated by subtracting the measured voltage of the intermediate circuit from the direct voltage reference value and by conducting the obtained difference variable to the intermediate circuit voltage controller, from the output of which the current reference $i_{q,ref}$ is obtained, as can be seen from the block diagram of FIG. 2.

As described earlier, the measured currents have been converted to the same coordinate system as the generated current references. Thus, the comparison of the currents mentioned makes sense, and on the basis of the currents, the control circuits are further implemented in accordance with the invention, the torque reference and the absolute value reference of the flux linkage being obtained as the outputs of the control circuits. The actual values $i_d$ and $i_q$ of the current of the synchronous coordination system must be low-pass-filtered before the calculation of the difference variable. In FIG. 2, the low-pass filtering is implemented by means of filtering members 8 and 9.

Low-pass filtering the currents $i_d$ and $i_q$ provides low-pass-filtered current vector components $i_{d,lpf}$ and $i_{q,lpf}$. Low-pass filtering removes the switching-frequency oscillation of the current. An intense effect of the switching-frequency current oscillation on the absolute value reference of the flux linkage and the torque reference would prevent purposeful operation of the control method. Conventional discreet filter algorithms can be used for the low-pass filtering of currents.

In accordance with the invention, a torque reference $t_{e,ref}$ is generated by comparing the current reference $i_{q,ref}$ in the direction q with the current vector component $i_{q,lpf}$ in the direction q. Preferably, the torque reference is generated in such a way that the difference between the current reference in the direction q and the low-pass filtered current vector component in the direction q is conducted to a current controller in the direction q, whereby the torque reference $t_{e,ref}$ to be used is obtained from the output of the current controller. In other words, the current controller 3 tends to minimize the difference between the current reference in the direction q and the low-pass filtered current vector component in the direction q by affecting the output currents of the inverter through the torque reference.

In the method according to the invention, the absolute value reference $|\overline{\psi}|_{ref}$ of the flux linkage is generated for the use of the DTC block by comparing the current reference $i_{d,ref}$ in the direction d with the low-pass-filtered current vector component $i_{d,lpf}$ in the direction d. Preferably, the absolute value reference of the flux linkage is generated by subtracting the low-pass-filtered current vector component $i_{d,lpf}$ in the direction d from the current reference $i_{d,ref}$ in the direction d. The difference obtained from the subtraction is further conducted to a current controller in the direction d, whereby the absolute value reference $|\overline{\psi}|_{ref}$ of the flux linkage to be used is obtained from the output of the current controller. In other words, current vector components in the direction d are used to control the size of the flux linkage, and the absolute value reference of the flux linkage is further used as a variable on the basis of which the switching commands of the inverter are generated by using the DTC method known as such and the optimum switching table related thereto. The above-described controllers 1, 2, 3 and 4 are typically controllers operating by means of a PI algorithm, but it is to be noted that the controller algorithm to be used can be any algorithm implementing the control in a purposeful manner.

As mentioned earlier, the flux linkage absolute value and torque signals generated by the outermost control loops are used in accordance with the invention to form switching commands of power switches in accordance with the DTC principle. The DTC block 5 contains a model of a motor or a corresponding load in a known manner. On the basis of this model, the values of the flux linkage and the torque are calculated from the load.

The DTC block 5 in FIG. 2 also comprises the power switches used in the inverter, whereby the voltages generated by the power switches form directly the output of the block. As shown in FIG. 2, currents $i_A$, $i_C$ of two phases are measured in accordance with the invention from the output of the block 5.

The DTC block further comprises innermost control loops that are the hysteresis controls of the flux and the torque. These controls are performed by means of real values obtained from the motor model and reference variables generated by synchronous power controllers, according to which variables the inner controllers tend to adjust the variables obtained from the model.

The optimum switching table is used in a known manner in such a way that on the basis of the results of hysteresis comparisons used in said hysteresis controls, the most purposeful switching command combination as regards the control, at each particular moment of control, i.e. the voltage vector command of the output, is selected. Subsequently, this command is implemented by using separate control circuits controlling power switches of the output.

In accordance with a preferred embodiment of the invention, the generated output voltage is low-pass-filtered. This low-pass filtering is shown in FIG. 2 as a filter 10. The filter 10 is typically phase-specific and can be of the type of an L filter formed of one inductive component, an LC filter formed of an inductive component and a capacitive component, or for example an LCL filter formed of two inductive components and one capacitive component. The use of a filter in connection with an inverter is extremely recommendable, because the curve form of the current to be supplied to the network must be rather accurately similar to that of a sinusoid.

In the above, the method has been described in connection with an inverter, but it can also be applied to other alternate current devices, such as to electric motor use provided with an LC filter.

It will be obvious to a person skilled in the art that as the technology advances, the basic idea of the invention can be implemented in a plurality of ways. The invention and its embodiments are thus not limited to the above examples but can vary within the claims.

What is claimed is:

1. A method in connection with an inverter, the inverter comprising a direct voltage intermediate circuit, an optimum switching table and output power switches, characterized by the method comprising the steps of defining a synchronous rectangular dq coordinate system;

measuring the phase currents ($i_A$, $i_C$) of the inverter outputs;

converting the phase currents ($i_A$, $i_C$) of the inverter to a synchronous dq coordinate system in order to achieve synchronous rectangular current vector components ($i_d$, $i_q$);

low-pass-filtering the synchronous current vector components ($i_d$, $i_q$) in order to achieve low-pass-filtered current vector components ($i_{d,lpf}$, $i_{q,lpf}$);

generating a current reference ($i_{q,ref}$) in the direction of the q axis of the dq coordinate system;

generating a current reference ($i_{d,ref}$) in the direction of the d axis of the dq coordinate system;

generating a torque ($t_{e,ref}$) reference by comparing the current reference ($i_{q,ref}$) in the direction q with a low-pass-filtered current vector component ($i_{q,lpf}$) in the direction q;

generating an absolute value reference ($|\bar{\psi}|_{ref}$) of the flux linkage by comparing the current reference ($i_{d,ref}$) in the direction d with a low-pass-filtered current vector component ($i_{d,lpf}$) in the direction d; and forming switching commands of the power switches on the basis of the torque reference ($t_{e,ref}$) and the flux reference ($|\bar{\psi}|_{ref}$) by using an optimum switching table (5).

2. A method according to claim 1, characterized by the generation of the current reference ($i_{q,ref}$) in the direction of the q axis of the dq coordinate system comprising the steps of forming the direct voltage reference value ($U_{dc,ref}$) of the intermediate circuit;

determining the voltage ($U_{dc}$) of the intermediate circuit of the inverter; and comparing the direct voltage reference value ($U_{dc,ref}$) with the voltage ($U_{dc}$) of the intermediate circuit to provide the current reference ($i_{q,ref}$) in the direction q of the synchronous coordinate system.

3. A method according to claim 2, characterized by the generation of the current reference ($i_{q,ref}$) in the direction of the q axis comprising the steps of subtracting the voltage ($U_{dc}$) of the intermediate circuit from the direct voltage reference value ($U_{dc,ref}$) to generate a difference variable; and conducting the generated difference variable to an intermediate circuit controller (1), whereby the current reference ($i_{q,ref}$) in the direction q is obtained from the output of the intermediate voltage controller.

4. A method according to claim 1, characterized by the generation of the current reference ($i_{d,ref}$) in the direction of the d axis of the dq coordinate system comprising the steps of generating a reactive power reference value ($q_{ref}$);

estimating the reactive power ($q_{est}$) of the inverter; and comparing the reactive power reference value with the estimated reactive power of the synchronous current coordinate system to provide the current reference ($i_{d,ref}$).

5. A method according to claim 4, characterized by the generation of the current reference ($i_{d,ref}$) in the direction of the d axis comprising the steps of subtracting the estimated reactive power ($q_{est}$) of the inverter from the reactive power reference value ($q_{ref}$) to provide a difference variable; and conducting the generated difference variable to the reactive power controller (2) to provide the current reference ($i_{d,ref}$) in the direction d.

6. A method according to claim 1, characterized by the generation of the torque ($t_{e,ref}$) comprising the step of generating the torque ($t_{e,ref}$) by subtracting the low-pass-filtered current vector component ($i_{q,lpf}$) in the direction q from the current reference ($i_{q,ref}$) in the direction q.

7. A method according to claim 6, characterized by the generation of the torque reference ($t_{e,ref}$) comprising the step of conducting the difference between the torque reference ($i_{q,ref}$) in the direction q and the low-pass-filtered current vector component ($i_{q,lpf}$) in the direction q to a current controller (3) in the direction q, whereby the torque reference ($t_{e,ref}$) is obtained from the output of the current controller.

8. A method according to claim 1, characterized by the generation of the absolute value reference ($|\overline{\psi}|_{ref}$) of the flux linkage comprising the step of generating the absolute value reference ($|\overline{\psi}|_{ref}$) of the flux linkage by subtracting the low-pass-filtered current vector component ($i_{d,lpf}$) in the direction d from the current reference ($i_{d,ref}$) in the direction d.

9. A method according to claim 8, characterized by the generation of the absolute value reference ($|\overline{\psi}|_{ref}$) of the flux linkage comprising the step of conducting the difference of the current reference ($i_{d,ref}$) in the direction d and the low-pass-filtered current vector component ($i_{d,lpf}$) in the direction d to a current controller (4), whereby the absolute value reference ($|\overline{\psi}|_{ref}$) of the flux linkage is obtained from the output of the current controller (4).

10. A method according to any one of the preceding claims, characterized by the switching commands of the power switches being implemented to generate an output voltage and the generated output voltage being low-pass-filtered.

11. A method according to claim 1, characterized by the conversion of the phase currents of the inverter to the synchronous dq coordinate system comprising the steps of determining from the measured phase currents rectangular components ($i_x$, $i_y$) of the current vector of the inverter in the stationary xy coordinate system; and converting the rectangular components ($i_x$, $i_y$) of the current vector of the stationary coordinate system to the synchronous dq coordinate system to provide rectangular current vector components ($i_d$, $i_q$).

* * * * *